(12) United States Patent
Cleodolphi et al.

(10) Patent No.: US 12,471,531 B2
(45) Date of Patent: Nov. 18, 2025

(54) MODULAR CHASSIS ASSEMBLY AND SYSTEM FOR A SUGAR CANE HARVESTER

(71) Applicant: CNH Industrial America LLC, New Holland, PA (US)

(72) Inventors: Daenio Cleodolphi, Piracicaba (BR); Marco Aurélio Ramos Pereira, Piracicaba (BR); Gilberto José Ribeiro Alves, Piracicaba (BR); João Augusto Marcolin Lucca, São Pedro (BR); José Carlos Lima de Oliveira Junior, Piracicaba (BR)

(73) Assignee: CNH Industrial America LLC, New Holland, PA (US)

(*) Notice: Subject to any disclaimer, the term of this patent is extended or adjusted under 35 U.S.C. 154(b) by 873 days.

(21) Appl. No.: 17/613,829

(22) PCT Filed: May 22, 2020

(86) PCT No.: PCT/BR2020/050178
§ 371 (c)(1),
(2) Date: Nov. 23, 2021

(87) PCT Pub. No.: WO2020/232523
PCT Pub. Date: Nov. 26, 2020

(65) Prior Publication Data
US 2022/0232774 A1    Jul. 28, 2022

(30) Foreign Application Priority Data
May 23, 2019 (BR) .................. 102019010533-0

(51) Int. Cl.
*A01D 67/00* (2006.01)
*A01D 41/16* (2006.01)
(Continued)

(52) U.S. Cl.
CPC ........... *A01D 67/005* (2013.01); *A01D 41/16* (2013.01); *A01D 45/10* (2013.01); *A01D 57/22* (2013.01);
(Continued)

(58) Field of Classification Search
CPC ...... A01D 67/005; A01D 45/10; A01D 57/22; B62D 21/09; B62D 21/12; B62D 21/18; B62D 63/025; B62D 65/04
See application file for complete search history.

(56) References Cited

U.S. PATENT DOCUMENTS

| 4,168,087 A | 9/1979 | Paplaski et al. |
| 4,846,198 A | 7/1989 | Carnewal et al. |

(Continued)

FOREIGN PATENT DOCUMENTS

WO   2019051573 A1   3/2019

OTHER PUBLICATIONS

International Search Report and Written Opinion for PCT Application No. PCT/BR2020/050178 dated Nov. 26, 2020 (18 pages).
(Continued)

*Primary Examiner* — Joseph M Rocca
*Assistant Examiner* — Julia C Tran
(74) *Attorney, Agent, or Firm* — Dority & Manning, P.A.

(57) ABSTRACT

A modular frame system for a sugarcane harvester includes a base frame section having a forward end and an aft end, with the base frame section defining a forward interface portion at the forward end. The system also includes a plurality of interchangeable front frame sections configured to be removably coupled to the base frame section, with each front frame section having a unique frame arrangement as compared to the remainder of the interchangeable front frame sections such that each front frame section is adapted to provide a differing harvesting configuration for the sug-
(Continued)

arcane harvester when selected for installation on the base frame section. Moreover, each front frame section includes a front end and a rear interface end, with the rear interface ends of the interchangeable front frame sections defining a common interface portion configured to be coupled to the forward interface portion of the base frame section.

17 Claims, 7 Drawing Sheets

(51) Int. Cl.
*A01D 45/10* (2006.01)
*A01D 57/22* (2006.01)
*B62D 21/09* (2006.01)
*B62D 21/12* (2006.01)
*B62D 21/18* (2006.01)
*B62D 63/02* (2006.01)
*B62D 65/04* (2006.01)

(52) U.S. Cl.
CPC ............ *B62D 21/09* (2013.01); *B62D 21/12* (2013.01); *B62D 21/18* (2013.01); *B62D 63/025* (2013.01); *B62D 65/04* (2013.01)

(56) References Cited

U.S. PATENT DOCUMENTS

| | | | |
|---|---|---|---|
| 8,857,853 B2 | 10/2014 | Lin | |
| 10,130,034 B2 | 11/2018 | Marchesan | |
| 10,194,589 B2* | 2/2019 | Almeida | A01D 43/08 |
| 2010/0307121 A1* | 12/2010 | Marchini | A01D 75/28 |
| | | | 56/63 |
| 2014/0174048 A1* | 6/2014 | Lawson | A01D 45/10 |
| | | | 56/13.9 |
| 2014/0352272 A1 | 12/2014 | Parker et al. | |
| 2015/0327437 A1 | 11/2015 | Mixon et al. | |
| 2015/0327438 A1* | 11/2015 | Cazenave | A01D 45/10 |
| | | | 56/51 |
| 2015/0359177 A1 | 12/2015 | Richard et al. | |
| 2016/0278291 A1 | 9/2016 | Marchesan | |
| 2017/0000026 A1* | 1/2017 | Seki | A01D 34/661 |
| 2017/0280626 A1 | 10/2017 | Bertino | |
| 2018/0177129 A1* | 6/2018 | Almeida | A01D 45/10 |
| 2019/0008092 A1* | 1/2019 | Bertino | A01D 45/10 |
| 2019/0230861 A1* | 8/2019 | Burch | A01D 45/10 |

OTHER PUBLICATIONS

Chinese Office Action issued in corresponding Application No. CN 202080033247.7 (with English Translation) Dated Feb. 3, 2023 (12 pages).

* cited by examiner

MODULAR CHASSIS ASSEMBLY AND SYSTEM FOR A SUGAR CANE HARVESTER

FIELD OF THE INVENTION

The present subject matter relates generally to agricultural harvesters, such as sugarcane harvesters, and, more particularly, to a modular frame assembly for a sugarcane harvester and related modular frame systems.

BACKGROUND OF THE INVENTION

In an ever-changing agricultural landscape, adaptability is important to allow both manufacturers of agricultural harvesters and the end-users of such harvesters to be able to accommodate varying market demands, as well as varying trends in planting arrangements and/or the like. The need for such adaptability is particularly relevant in the cultivation and harvesting of sugarcane and other tall, stalky patents, where the industry is undergoing a rapid evolution in terms of both the development of new varieties of plants and the use varying planting configurations, all with an eye towards increased productivity. In this regard, manufacturers of sugarcane harvesters have made substantial efforts to provide machines that accommodate the varying market demands, such as by designing harvesters capable of harvesting two or more crop rows as opposed to a single row (i.e., multi-row harvesting) and/or by designing harvesters configured to allow a separate harvesting attachment to be coupled thereto. However, to date, conventional harvesters have been specifically adapted for the specific type of harvesting operations being performed, such as by having a specific frame or chassis configuration for single row harvesting, a different frame or chassis configuration for multi-row harvesting, and yet another frame or chassis configuration for header-based harvesting. Accordingly, to provide commercial versions of each of such machines, current manufacturers are required to spend substantial time and capital in the development and deployment of such machine variations.

Accordingly, what is needed in the industry is a modular frame assembly for a sugarcane harvester and related modular frame systems that allow for various different harvesting configurations to be accommodated by using shared or common frame components or sections within each machine variation.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a modular frame system for a sugarcane harvester. The system includes a base frame section having a forward end and an aft end, with the base frame section defining a forward interface portion at the forward end. The base frame section is configured to support one or more processing components to facilitate processing of harvested crop materials. The system also includes a plurality of interchangeable front frame sections configured to be removably coupled to the base frame section, with each front frame section having a unique frame arrangement as compared to the remainder of the interchangeable front frame sections such that each front frame section is adapted to provide a differing harvesting configuration for the sugarcane harvester when selected for installation on the base frame section. Moreover, each front frame section includes a front end and a rear interface end, with the rear interface ends of the interchangeable front frame sections defining a common interface portion configured to be coupled to the forward interface portion of the base frame section.

In another aspect, the present subject matter is directed to a modular frame assembly for a sugarcane harvester. The modular frame assembly includes base frame section having a forward end and an aft end, with the base frame section defining a forward interface portion at the forward end and an aft interface portion at the aft end. The base frame section is configured to support one or more processing components to facilitate processing of harvested crop material. The modular frame assembly also includes a front frame section configured to be removably coupled to the forward end of the base frame section, with the front frame section including a front end and a rear interface end. The rear interface end of the front frame section defines an interface portion configured to be removably coupled to the forward interface portion of the base frame section. In addition, the front frame section is configured to support one or more harvesting components to facilitate harvesting of crop materials from a field. Moreover, the modular frame assembly includes a rear frame section configured to be removably coupled to the aft end of the base frame section, with the rear frame section including a front interface end and a rear end. The front interface end of the rear frame section defines an interface portion configured to be removably coupled to the aft interface portion of the base frame section. Furthermore, the rear frame section is configured to support one or more extractor components to facilitate separation of debris from harvested crop materials.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
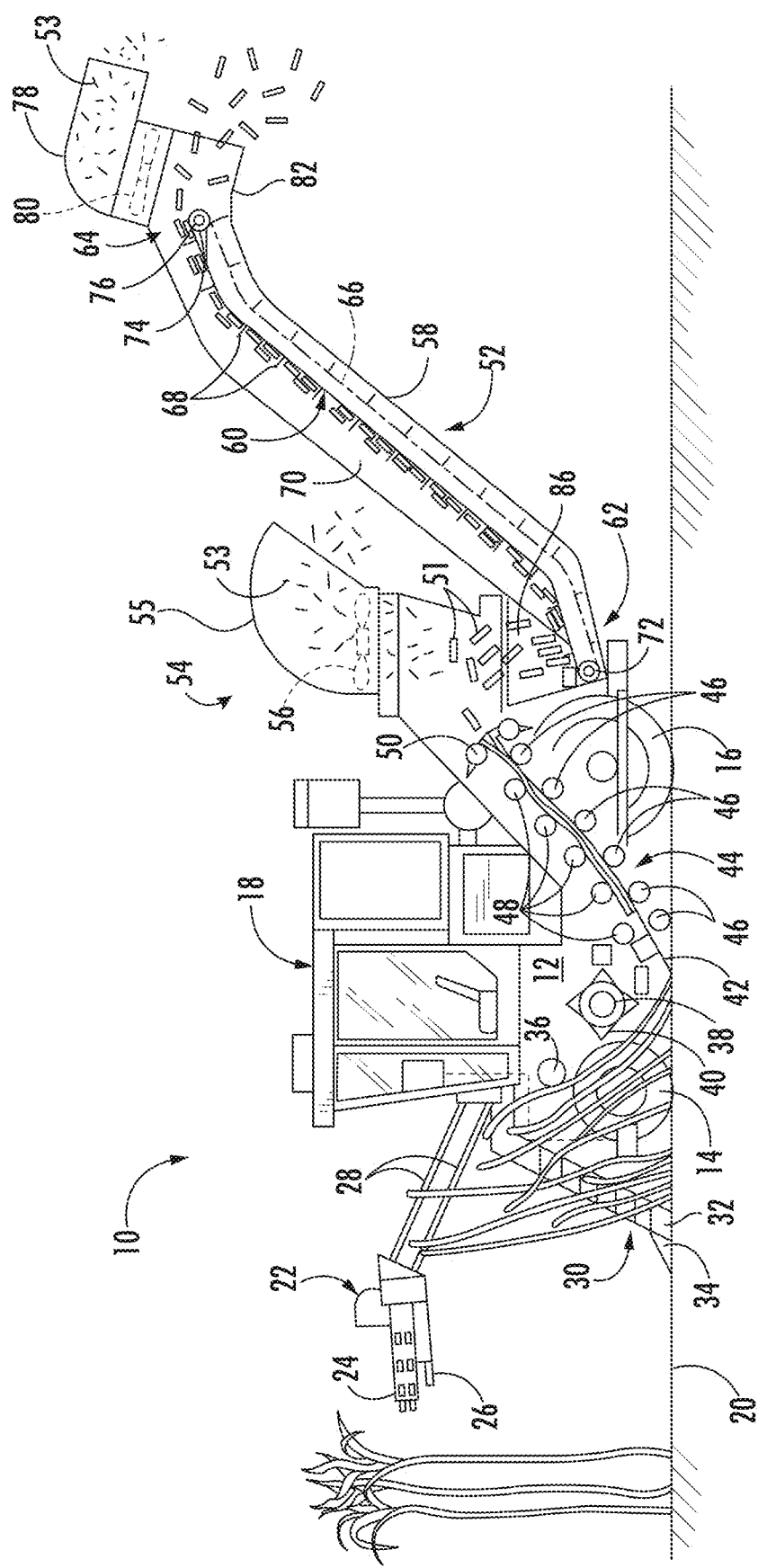
FIG. 1 illustrates a simplified, side view of one embodiment of an agricultural harvester in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a modular frame assembly for a sugarcane harvester and related modular frame systems. Specifically, in several embodiments, the disclosed system includes a base frame section and a plurality of frame section modules configured to be removably coupled to the base frame section. For example, in several embodiments, the base frame section may extend lengthwise between a forward end and an aft end, with the system including a plurality of interchangeable front frame sections configured to be removably coupled to the forward end of the base frame section. In such embodiments, the various modular front frame sections may be configured to have differing frame arrangements, with each frame arrangement being adapted to provide a different harvesting configuration. For instance, the differing front frame sections may be provided to allow for the resulting modular frame assembly to be used for any combination of single row harvesting, multi-row harvesting, double row alternating harvesting, and/or header-based harvesting. Thus, in accordance with aspects of the present subject matter, various harvesting configurations may be provided using a common base frame section and by simply selecting the appropriate front frame section that is adapted to provide the desired harvesting configuration. Such modularity, in turn, allows manufacturers to provide various machine configurations in an efficient and cost-effective manner.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

Additionally, the harvester 10 may include various components for cutting/harvesting, processing, cleaning, and discharging sugarcane as the cane is harvested from an agricultural field 20. For instance, the harvester 10 may include a topper assembly 22 positioned at its front end to intercept sugarcane as the harvester 10 is moved in the forward direction. As shown, the topper assembly 22 may include both a gathering disk 24 and a cutting disk 26. The gathering disk 24 may be configured to gather the sugarcane stalks so that the cutting disk 26 may be used to cut off the top of each stalk. As is generally understood, the height of the topper assembly 22 may be adjustable via a pair of arms 28 hydraulically raised and lowered, as desired, by the operator.

Additionally, the harvester 10 may include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugarcane stalks for harvesting. Moreover, as shown in FIG. 1, the harvester 10 may include a knock-down roller 36 positioned near the front wheels 14 and a fin roller 38 positioned behind the knock-down roller 36. As the knock-down roller 36 is rotated, the sugarcane stalks being harvested are knocked down while the crop divider 30 gathers the stalks from agricultural field 20. Further, as shown in FIG. 1, the fin roller 38 may include a plurality of intermittently mounted fins 40 that assist in forcing the sugarcane stalks downwardly. As the fin roller 38 is rotated during the harvest, the sugarcane stalks that have been knocked down by the knock-down roller 36 are separated and further knocked down by the fin roller 38 as the harvester 10 continues to be moved in the forward direction relative to the field 20.

Referring still to FIG. 1, the harvester 10 may also include a base cutter assembly 42 positioned behind the fin roller 38. As is generally understood, the base cutter assembly 42 may include blades (not shown) for severing the sugarcane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugarcane as the cane is knocked down by the fin roller 38.

Moreover, the harvester 10 may include a feed roller assembly 44 located downstream of the base cutter assembly 42 for moving the severed stalks of sugarcane from base cutter assembly 42 along the processing path. As shown in FIG. 1, the feed roller assembly 44 may include a plurality of bottom rollers 46 and a plurality of opposed, top pinch rollers 48. The various bottom and top rollers 46, 48 may be used to pinch the harvested sugarcane during transport. As the sugarcane is transported through the feed roller assembly 44, debris (e.g., rocks, dirt, and/or the like) may be allowed to fall through bottom rollers 46 onto the field 20.

In addition, the harvester 10 may include a chopper assembly 50 located at the downstream end of the feed roller assembly 44 (e.g., adjacent to the rearward-most bottom and top feed rollers 46, 48). In general, the chopper assembly 50 may be used to cut or chop the severed sugarcane stalks into pieces or "billets" 51, which may be, for example, six (6) inches long. The billets 51 may then be propelled towards an elevator assembly 52 of the harvester 10 for delivery to an external receiver or storage device (not shown).

As is generally understood, pieces of debris 53 (e.g., dust, dirt, leaves, etc.) separated from the sugarcane billets 51 may be expelled from the harvester 10 through a primary extractor 54, which is located immediately behind the chopper assembly 50 and is oriented to direct the debris 53 outwardly from the harvester 10. The primary extractor 54 may include, for example, an extractor hood 55 and an extractor fan 56 mounted within the hood 55 for generating a suction force or vacuum sufficient to pick up the debris 53 and force the debris 53 through the hood 55. The separated or cleaned billets 51, heavier than the debris 53 being expelled through the extractor 54, may then fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugarcane billets 51 on the elevator 60 as the billets are elevated along a top span 70 of the elevator 70 defines between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, in some embodiments, pieces of debris 53 (e.g., dust, dirt, leaves, etc.) separated from the elevated sugarcane billets 51 may be expelled from the harvester 10 through a secondary extractor 78 coupled to the rear end of the elevator housing 58. For example, the debris 53 expelled by the secondary extractor 78 may be debris remaining after the billets 51 are cleaned and debris 53 expelled by the primary extractor 54. As shown in FIG. 1, the secondary extractor 78 may be located adjacent to the distal end 64 of the elevator 60 and may be oriented to direct the debris 53 outwardly from the harvester 10. Additionally, an extractor fan 80 may be mounted at the base of the secondary extractor 78 for generating a suction force or vacuum sufficient to pick up the debris 53 and force the debris 53 through the secondary extractor 78. The separated, cleaned billets 51, heavier than the debris 53 expelled through the extractor 78, may then fall from the distal end 64 of the elevator 60. Typically, the billets 51 may fall downwardly through an elevator discharge opening 82 of the elevator assembly 52 into an external storage device (not shown), such as a sugarcane billet cart.

During operation, the harvester 10 is traversed across the agricultural field 20 for harvesting sugarcane. After the height of the topper assembly 22 is adjusted via the arms 28, the gathering disk 24 on the topper assembly 22 may function to gather the sugarcane stalks as the harvester 10 proceeds across the field 20, while the cutter disk 26 severs the leafy tops of the sugarcane stalks for disposal along either side of harvester 10. As the stalks enter the crop divider 30, the ground shoes 34 may set the operating width to determine the quantity of sugarcane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugarcane stalks are conveyed rearwardly by the bottom and top feed rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugarcane stalks into pieces or billets 51 (e.g., 6-inch cane sections). The processed crop material discharged from the chopper assembly 50 is then directed as a stream of billets 51 and debris 53 into the primary extractor 54. The airborne debris 53 (e.g., dust, dirt, leaves, etc.) separated from the sugarcane billets is then extracted through the primary extractor 54 using suction created by the extractor fan 56. The separated/cleaned billets 51 then fall downwardly through an elevator hopper 86 into the elevator assembly 52 and travel upwardly via the elevator 60 from its proximal end 62 to its distal end 64. During normal operation, once the billets 51 reach the distal end 64 of the elevator 60, the billets 51 fall through the elevator discharge opening 82 to an external storage device. If provided, the secondary extractor 78 (with the aid of the extractor fan 80) blows out trash/debris 53 from harvester 10, similar to the primary extractor 54.

Figure 2:
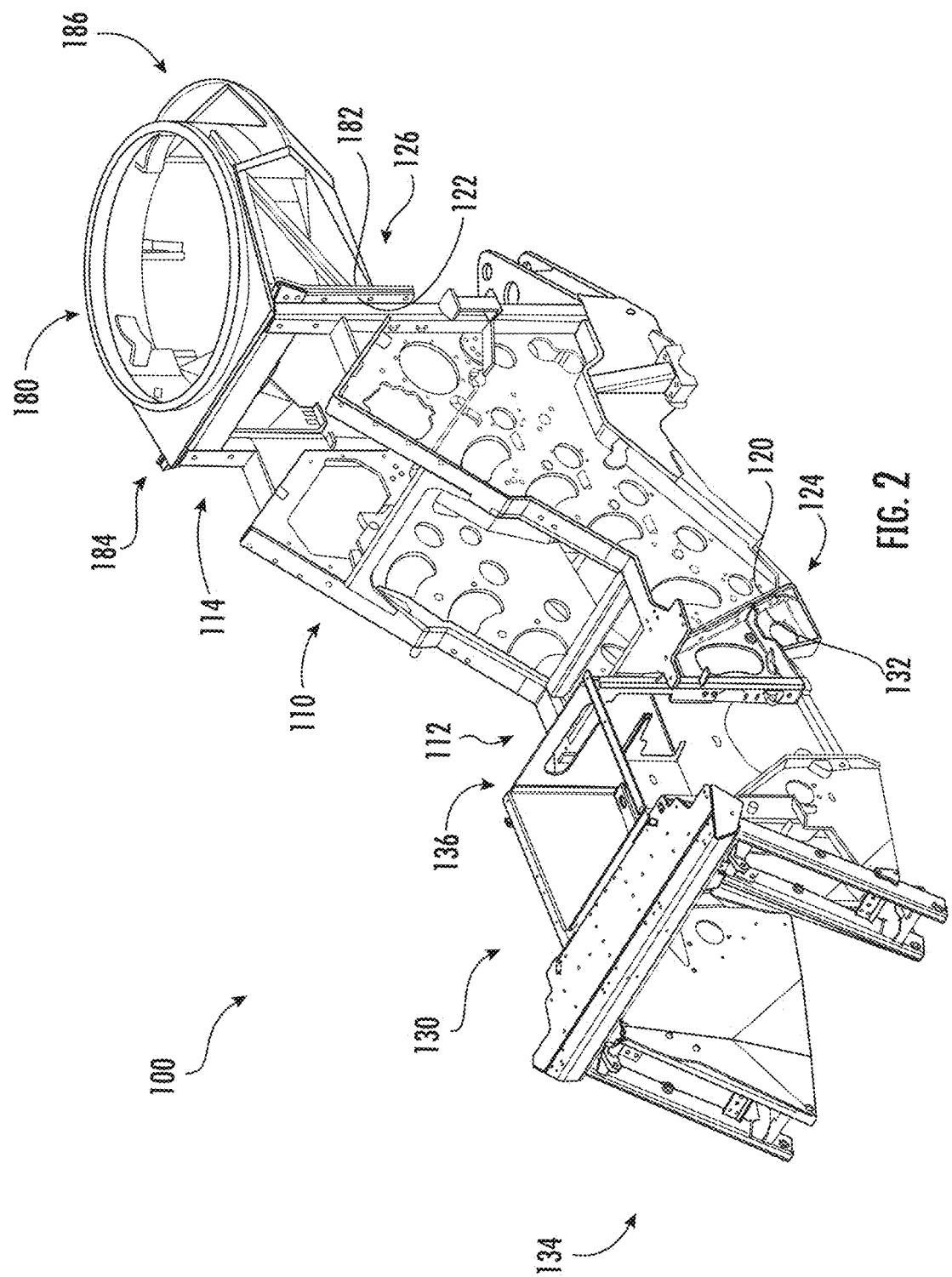
FIG. 2 illustrates a perspective, assembled view of one embodiment of a modular frame assembly configured for use within a sugarcane harvester in accordance with aspects of the present subject matter, particularly illustrating the modular frame assembly including a base frame section and separate front and rear frame sections configured to be removably coupled to the base frame section.
Figure 3:
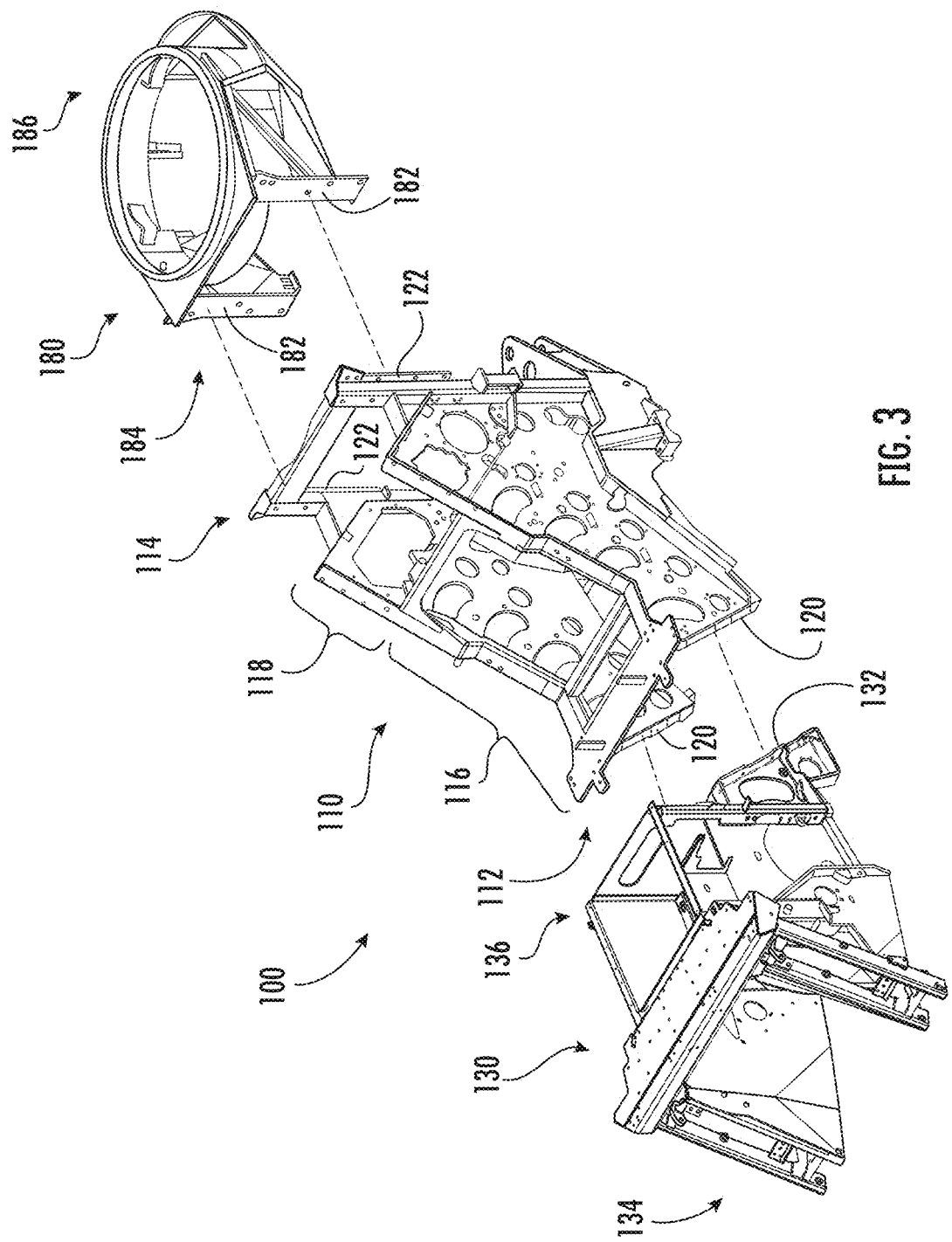
FIG. 3 illustrates a perspective, exploded view of the modular frame assembly shown in FIG. 2.

Referring now to FIGS. 2 and 3, perspective views of one embodiment of a modular frame assembly 100 configured for use within a sugarcane harvester are illustrated in accordance with aspects of the present subject matter. Specifically, FIG. 2 illustrates a perspective, assembled view of the modular frame assembly 100 and FIG. 3 illustrates a perspective, exploded view of the modular frame assembly 100 shown in FIG. 2. In one embodiment, the modular frame assembly 100 may, for example, be used as the frame 12 for the exemplary harvester 10 shown in FIG. 1 to facilitate supporting the various relevant harvester components described above.

As shown in the illustrated embodiment, the modular frame assembly 100 includes a central or base frame section 110, along with front and rear frame sections 130, 180 configured to be removably coupled to the base frame section 110 at opposed ends of the base frame section 110. As will be described below, the frame sections 110, 130, 180 of the modular frame assembly 100 shown in FIGS. 2 and 3 may, in several embodiments, form part of a modular frame system 500 (FIG. 7) for a sugarcane harvester. For example, the front frame section 130 may correspond to one of a plurality of different interchangeable front frame sections configured to be removably coupled to the base frame section 110, with each front frame section having a unique frame arrangement for providing a different harvesting configuration. As a result, depending on the desired harvesting configuration for the harvester (e.g., a single row harvesting configuration, a multi-row harvesting configuration, a double row alternating harvesting configuration, and/or a header-based harvesting configuration), a particular front frame section may be selected for attachment onto the base frame section to provide the desired functionality.

As particularly shown in FIG. 3, the base frame section 110 extends lengthwise between a forward end 112 and an aft end 114 and is generally provided with a given base frame arrangement between its forward and aft ends 112, 114 for supporting one or more processing components of a sugarcane harvester. In one embodiment, the specific frame arrangement of the base frame section 110 may be characterized by various frame features, such as openings, bolt hole patterns, flanges, brackets, and/or the like, adapted or configured to allow various processing components of the harvester to be mounted to or otherwise supported by the base frame section 110. For instance, as shown in FIG. 3, a forward portion 116 of the base frame section 110 may be provided with suitable frame features for supporting the various rollers of a feed roller assembly, such as the bottom rollers 46 and the opposed, top pinch rollers 48 of the feed roller assembly 44 described above with reference to FIG. 1. Additionally, as shown in FIG. 3, an aft portion 118 of the base frame section 110 may be provided with suitable frame features for supporting the various components of a chopper assembly, such as the chopper assembly 50 described above with reference to FIG. 1.

Additionally, the base frame section 110 includes opposed interface portions 120, 122 defined at its forward and aft ends 112, 114 for coupling the front and rear frame sections 130, 180, respectively, to the base frame section 110. Specifically, as shown in FIG. 3, the base frame section 110 includes a forward interface portion 120 defined at its forward end 112 configured to interface with a corresponding interface portion 132 of the front frame section 130, thereby allowing a first joint interface 124 (FIG. 2) to be formed between such components when the front frame section 130 is mounted to the base frame section 110. Additionally, as shown in FIG. 3, the base frame section 110 includes an aft interface portion 122 defined at its aft end 114 configured to interface with a corresponding interface portion 182 of the rear frame section 180, thereby allowing a second joint interface 126 (FIG. 2) to be formed between such components when the rear frame section 180 is mounted to the base frame section 110.

Moreover, as shown in FIG. 3, the front frame section 130 extends lengthwise between a front end 134 and a rear interface end 136 and is generally provided with a given front frame arrangement between its front and rear ends 134, 136 for supporting one or more harvesting components of a sugarcane harvester. In one embodiment, the specific frame arrangement of the front frame section 130 may be characterized by various frame features, such as openings, bolt hole patterns, flanges, brackets, and/or the like, adapted or configured to allow various harvesting components of the harvester to be mounted to or otherwise supported by the front frame section 130. Specifically, the front frame section 130 may be provided with suitable frame features for supporting the various components of a sugarcane harvester configured to sever crop materials from the field and deliver such crop materials to the components of the feed roller assembly supported by the base frame section 110. For instance, in one embodiment, the front frame section 130 may configured to support any combination of one or more topper assemblies, crop dividers, knock-down rollers, fin rollers, and/or base cutter assemblies, such as the topper assembly 22, the crop divider 30, the knock-down roller 36, the fin roller 38, and the base cutter assembly 42 described above with reference to FIG. 1.

In several embodiments, the front frame section 130 illustrated in FIGS. 2 and 3 is adapted to provide a particular harvesting configuration for the modular frame assembly 100 when installed onto the base frame section 110. Specifically, in the illustrated embodiment, the frame arrangement and dimensional configuration of the front frame section 130 is adapted to provide a single row harvesting configuration for the modular frame assembly 100. As such, the front frame section 130 may be configured to support suitable components for harvesting a single row of crops. For instance, the front frame section 130 may be configured to support a pair of crop dividers located along opposed sides of the front end 134 of the front frame section 130 for separating the crop row to be harvested from adjacent rows, a knockdown roller and a fin roller disposed downstream of the crop dividers, and a cutter assembly (e.g., including a single cutting disc or a pair of cutting discs) downstream of the rollers for cutting the base of the crop material to be harvested.

In accordance with aspects of the present subject matter, the rear interface end 136 of the front frame section 130 is configured to be removably coupled to forward end 112 of the base frame section 110. For example, as indicated above, the front frame section 130 may define an interface portion 132 at its rear interface end 136 that is complementary to or that is otherwise configured to mate with the corresponding forward interface portion 120 defined by the base frame section 110 at its forward end 112. Specifically, as shown in the illustrated embodiment, the mating interface portions 120, 132 define complementary angled profiles such that the interface portion 132 of the front frame section 130 can be mounted flush against the corresponding interface portion 120 of the base frame section 110.

It should be appreciated that, as used herein, adjacent frame sections are configured to be "removably coupled" to each other using a non-permanent or removable attachment technique. For instance, in several embodiments, the front frame section 130 is configured to be removably coupled to the base frame section 110 using a plurality of mechanical fasteners, such as by using a plurality of bolts to form a bolted connection between the adjacent frame sections. In such embodiments, the corresponding interface portions 120, 132 of the front and base frame sections 130, 110 may define matching bolt hole patterns. As a result, when the interface portion 132 of the front frame section 130 is properly aligned relative to the forward interface portion 120 of the base frame section 110, a plurality of mechanical fasteners can be inserted through the aligned fastener openings provided by the matching bolt hole patterns to couple the front frame section 130 to the base frame section 110.

Referring still to FIGS. 2 and 3, as indicated above, the modular frame assembly 110 may also include a rear frame section 180 configured to be removably coupled to the aft end 114 of the base frame section 110. As particularly shown in FIG. 3, the rear frame section 180 extends lengthwise between a front interface end 184 and a rear end 186 and is generally provided with a given rear frame arrangement between its front and rear ends 184, 186 for supporting one or more extractor components of a sugarcane harvester. In one embodiment, the specific frame arrangement of the rear frame section 180 may be characterized by various frame features, such as openings, bolt hole patterns, flanges, brackets, and/or the like, adapted or configured to allow one or more extractor components of the harvester to be mounted to or otherwise supported by the rear frame section 180. Specifically, the rear frame section 180 may be provided with suitable frame features for supporting one or more components of a sugarcane harvester configured to separate debris from the crop materials flowing from the upstream components supported by base frame section 110. For instance, in one embodiment, the rear frame section 180 may configured to support one or more components of a primary extractor, such as the extractor hood 55 and the extractor fan 56 of the primary extractor 54 described above with reference to FIG. 1.

In several embodiments, the front interface end 184 of the rear frame section 180 is configured to be removably coupled to aft end 114 of the base frame section 110. For example, similar to the front frame section 130, the rear frame section 180 may define an interface portion 182 at its front interface end 184 that is complementary to or that is otherwise configured to mate with the corresponding aft interface portion 122 defined by the base frame section 110 at its aft end 114. Specifically, as shown in the illustrated embodiment, the mating interface portions 182, 122 define complementary vertically orientated profiles such that the interface portion 182 of the rear frame section 180 can be mounted flush against the corresponding interface portion 122 of the base frame section 110.

Additionally, similar to the front frame section 130, the rear frame section 180 may, in several embodiments, be configured to be removably coupled to the base frame section 110 using a plurality of mechanical fasteners, such as by using a plurality of bolts to form a bolted connection between the adjacent frame sections. In such embodiments, the corresponding interface portions 122, 182 of the base and rear frame sections 110, 180 may define matching bolt hole patterns. As a result, when the interface portion 182 of the rear frame section 180 is properly aligned relative to the aft interface portion 122 of the base frame section 110, a plurality of mechanical fasteners can be inserted through the aligned fastener openings provided by the matching bolt hole patterns to couple the rear frame section 180 to the base frame section 110.

It should be appreciated that, by including a removable rear frame section, the disclosed modular frame assembly 100 may allow the associated harvester to be operated in different modes. For example, by attaching the rear frame section 180 to the base frame section 110, the harvester may be operated in the operating mode described above with reference to FIG. 1 in which debris is extracted from the crop materials prior to the crop materials falling down into the elevator assembly 52. However, by removing the rear frame section 180 from the base frame section 110 or by simply choosing to not install the rear frame section 180 to the base frame section 110, the harvester may be operated in an energy harvesting mode in which both the crop material and the debris are delivered to the elevator assembly 52.

Figure 4:
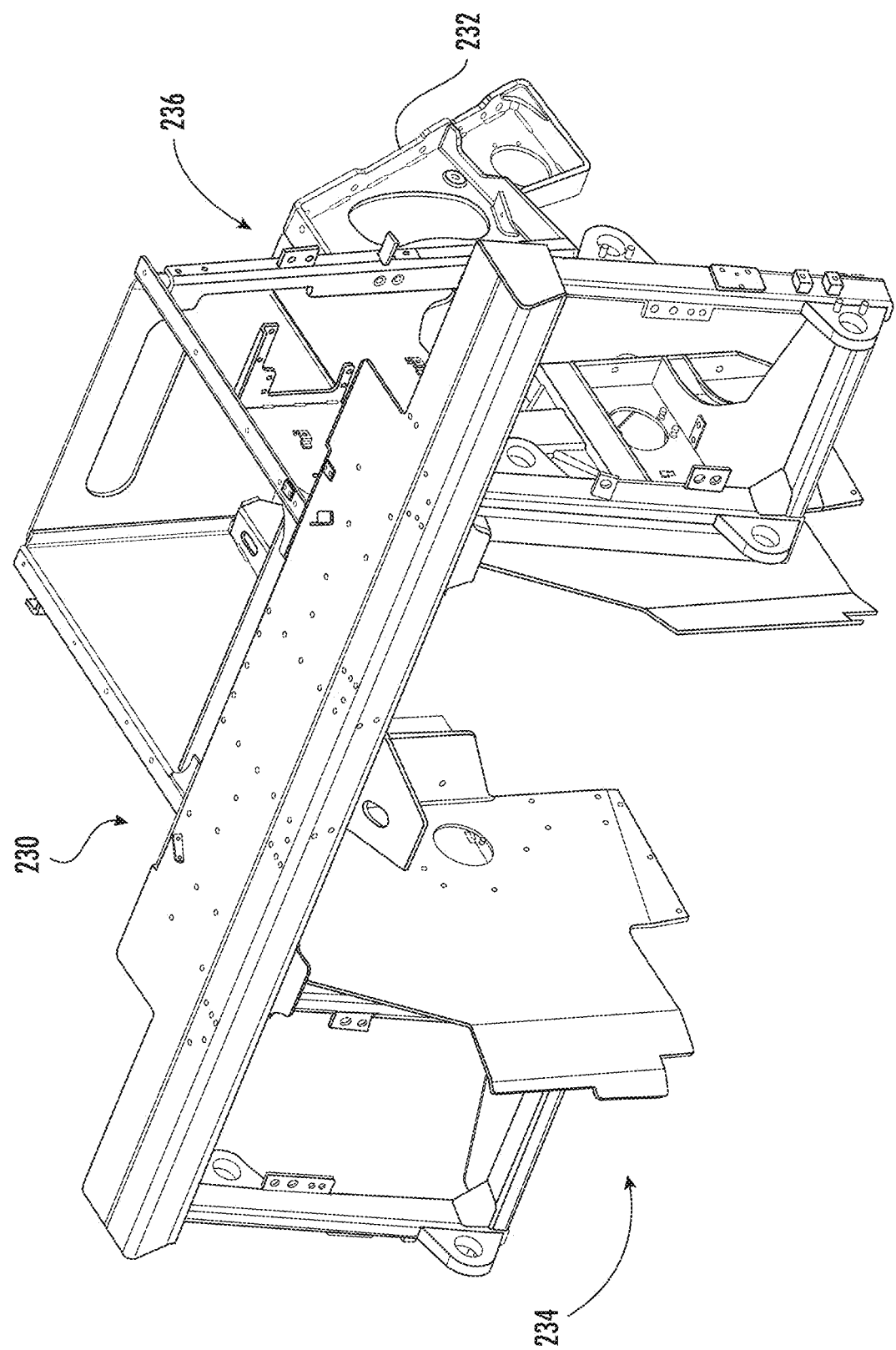
FIG. 4 illustrates a perspective view of another embodiment of a front frame section configured for use within the disclosed modular frame assembly in accordance with aspects of the present subject matter.
Figure 5:
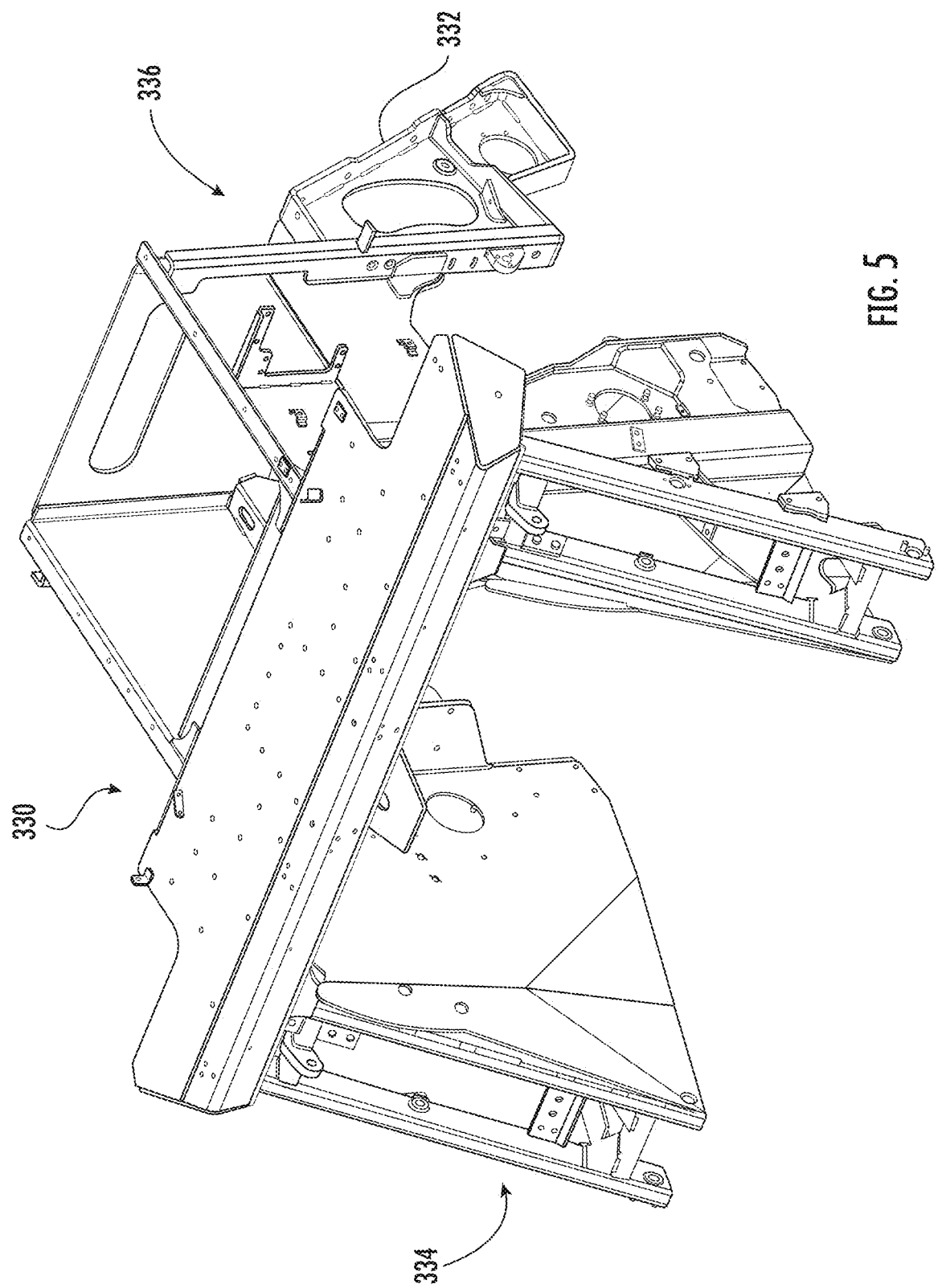
FIG. 5 illustrates a perspective view of a further embodiment of a front frame section configured for use within the disclosed modular frame assembly in accordance with aspects of the present subject matter.
Figure 6:
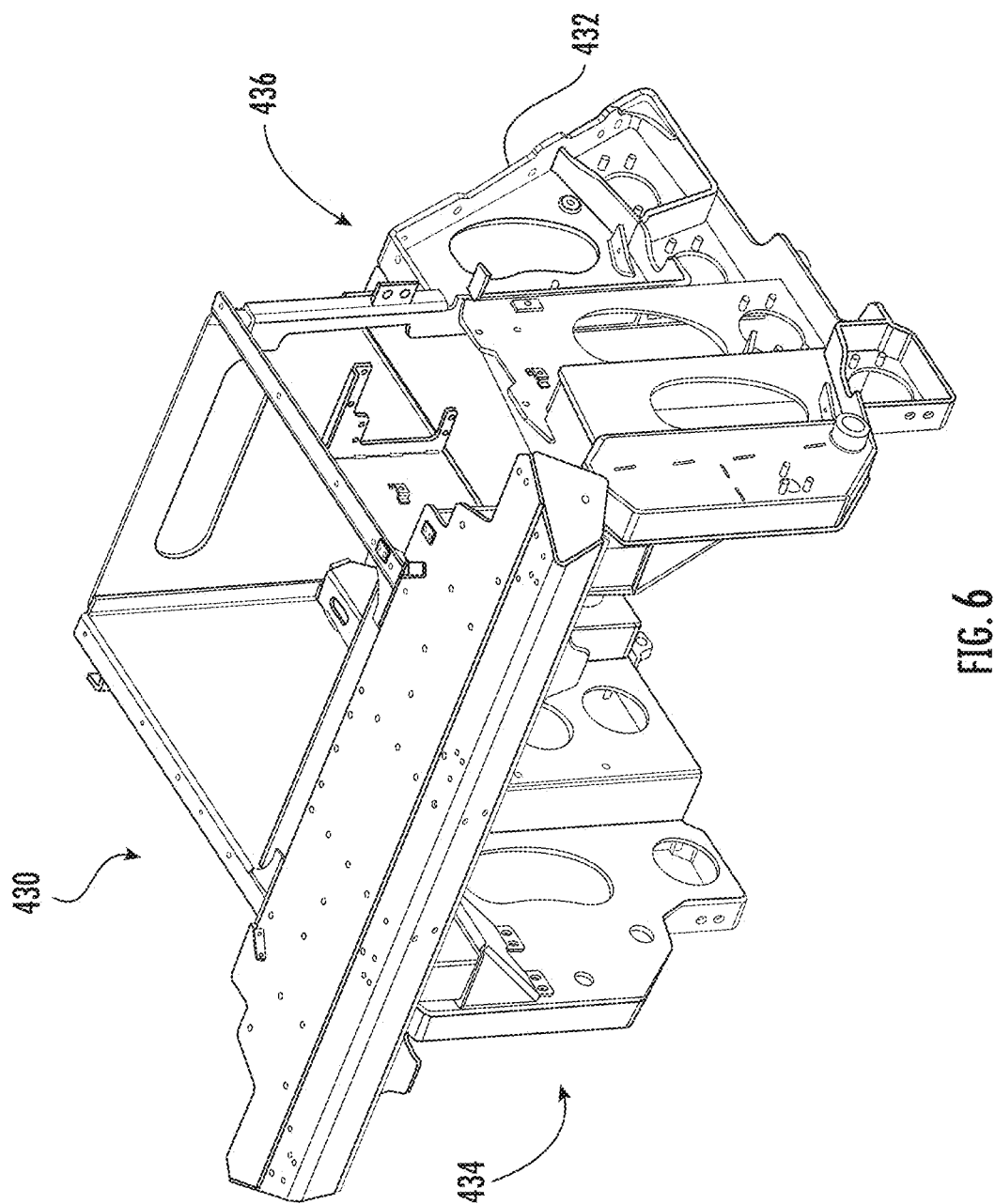
FIG. 6 illustrates a perspective view of yet another embodiment of a front frame section configured for use within the disclosed modular frame assembly in accordance with aspects of the present subject matter.

Referring now to FIGS. 4-6, perspective views of different embodiments of front frame sections 230, 330, 430 configured for use within the modular frame assembly 100 described above with reference to FIGS. 2 and 3 are illustrated in accordance with aspects of the present subject matter. Specifically, the front frame sections 230, 330, 430 shown in FIGS. 4-6 may be configured to be removably coupled to the base frame section 110 in place of the front frame section 130 shown in FIGS. 2 and 3. As such, it should be appreciated that the various front frame sections 130, 230, 330, 440 shown in FIGS. 2-6 may serve as interchangeable frame section modules for use with the base frame section 110.

As particularly shown in FIG. 4, a front frame section 230 is illustrated that is adapted to provide for a multi-row harvesting configuration (e.g., as opposed to the single row harvesting configuration described above with reference to the embodiment of the front frame section 130 shown in FIGS. 2 and 3). As shown, the front frame section 230 extends lengthwise between a front end 234 and a rear interface end 236 and is generally provided with a given front frame arrangement between its front and rear ends 234, 236 for supporting one or more harvesting components of a sugarcane harvester. Similar to the front frame section 130 described above, the specific frame arrangement of the front frame section 230 may be characterized by various frame features, such as openings, bolt hole patterns, flanges, brackets, and/or the like, adapted or configured to allow various harvesting components of the harvester to be mounted to or otherwise supported by the front frame section 230, such as one or more topper assemblies, crop dividers, knock-down rollers, fin rollers, base cutter assemblies and/or the like.

As indicated above, the front frame section 230 illustrated in FIG. 4 is adapted to provide for a multi-row harvesting configuration when installed onto the base frame section 110. Thus, in such an embodiment, the frame arrangement and dimensional configuration of the front frame section 230 may be adapted to support suitable components for harvesting, one, two, and/or three or more rows of crops. For instance, the front frame section 230 may be configured to support a pair of crop dividers located along opposed sides of the front end 234 of the front frame section 230 for separating the crop rows to be harvested from adjacent rows. The crop dividers may have a configuration and/or may be assembled in the frame in such a way to enable an adjustment of the distance between them, thereby varying the size of the opening defined by the crop dividers and, thus, allowing for one row, two rows or more to be harvested depending on the size of the opening. The front frame section 230 may also be configured to support a knockdown roller and a fin roller disposed downstream of the crop dividers, and one or more cutter assemblies positioned upstream and/or downstream of the rollers for cutting the base of the crop material to be harvested. An exemplary cutting arrangement that allows for a multi-row harvesting arrangement is described, for example, in U.S. Pat. No. 9,668,409, filed Apr. 9, 2012 and entitled "Cutting System for a Harvester and a Sugar Cane Harvester Cutting System," the disclosure of which is hereby incorporated by reference herein in its entirety for all purposes. With such a multi-row harvesting arrangement, the harvester includes a pair of upstream cutting elements (e.g., one cutting element positioned adjacent to each crop divider) positioned upstream of the knockdown and fin rollers and internal, centralized cutting assembly position downstream of the rollers. In such an embodiment, the front frame section 230 shown in FIG. 4 may, for example, be configured to support by the upstream cutting elements and the downstream cutting assembly. Another exemplary configuration that allows for a multi-row harvesting arrangement is described, for example, in U.S. Pat. No. 9,826,685, filed Oct. 28, 2015 and entitled "Vertical Roller Device to Aid in Feeding Sugar Cane Stalk to Harvester," the disclosure of which is hereby incorporated by reference herein in its entirety for all purposes. In such an embodiment, the front frame section 230 shown in FIG. 4 may, for example, be configured to support the vertical rollers disclosed in such exemplary harvesting configuration to assist in guiding sugarcane stalks towards the center of the frame section 230.

Moreover, as shown in FIG. 4, the rear interface end 236 of the front frame section 230 is configured to be removably coupled to forward end 112 of the base frame section 110. For example, similar to the front frame section 130 described above with reference to FIGS. 2 and 3, the front frame section 230 may define an interface portion 232 at its rear interface end 236 that is complementary to or that is otherwise configured to mate with the corresponding forward interface portion 120 defined by the base frame section 110 at its forward end 112. Specifically, as shown in the illustrated embodiment, the interface portion 232 of the front frame section 230 defines an angled profile that is complementary to the angled profile of the forward interface portion 120 defined by the base frame section 110 such that the front frame section 230 can be mounted flush against the base frame section 110. In such an embodiment, the angled profile of the interface portion 232 of the front frame section 230 may be configured the same as the angled profile of the interface portion 132 of the front frame section 130 shown in FIGS. 2 and 3 to allow such frame sections 130, 230 be interchangeable relative to the base frame section 110.

Referring now to FIG. 5, a front frame section 330 is illustrated that is adapted to provide for a double row alternating harvesting configuration (e.g., as opposed to the single row harvesting configuration and the double row harvesting configuration described above with reference to the embodiments of the front frame sections 130, 230 shown in FIGS. 2-4). As shown, the front frame section 330 extends lengthwise between a front end 334 and a rear interface end 336 and is generally provided with a given front frame arrangement between its front and rear ends 334, 336 for supporting one or more harvesting components of a sugarcane harvester. Similar to the front frame sections 130, 230 described above, the specific frame arrangement of the front frame section 330 may be characterized by various frame features, such as openings, bolt hole patterns, flanges, brackets, and/or the like, adapted or configured to allow various harvesting components of the harvester to be mounted to or otherwise supported by the front frame section 330, such as one or more topper assemblies, crop dividers, knock-down rollers, fin rollers, base cutter assemblies and/or the like.

As indicated above, the front frame section 330 illustrated in FIG. 5 is adapted to provide for a double row alternating harvesting configuration when installed onto the base frame section 110. Thus, in such an embodiment, the frame arrangement and dimensional configuration of the front frame section 330 may be adapted to support suitable components for harvesting crop materials planted in a double-alternating configuration (e.g., crops planted at alternating spacing distances, such as by spacing the crops at one distance (e.g., 90 cm) and at another distance (e.g., 150 cm) in an alternating form or arrangement. For instance, similar to the front frame sections 130, 230 described above, the front frame section 330 may be configured to support a pair of crop dividers located along opposed sides of the forward end of the front frame section 330 for separating the crop row(s) to be harvested from adjacent rows, a knockdown roller and a fin roller disposed downstream of the upstream cutting elements, and one or more cutter assemblies positioned upstream and/or downstream of the rollers for cutting the base of the crop material to be harvested. Additionally, in one embodiment, to facilitate harvesting crops planted in a double-alternating configuration, the lateral width or spacing of the opening defined at the forward end of the front frame section 330 may be increased in size (e.g., as compared to the front frame section 130 described above).

Moreover, as shown in FIG. 5, the rear interface end 336 of the front frame section 330 is configured to be removably coupled to forward end 112 of the base frame section 110. For example, similar to the front frame sections 130, 230 described above with reference to FIGS. 2-4, the front frame section 330 may define an interface portion 332 at its rear interface end 336 that is complementary to or that is otherwise configured to mate with the corresponding forward interface portion 120 defined by the base frame section 110 at its forward end 112. Specifically, as shown in the illustrated embodiment, the interface portion 332 of the front frame section 330 defines an angled profile that is complementary to the angled profile of the forward interface portion 120 defined by the base frame section 110 such that the front frame section 330 can be mounted flush against the base frame section 110. In such an embodiment, the angled profile of the interface portion 332 of the front frame section 330 may be configured the same as the angled profile of the interface portions 132, 232 of the front frame sections 130, 230 shown in FIGS. 2-4 to allow such frame sections 130, 230, 330 be interchangeable relative to the base frame section 110.

Referring now to FIG. 6, a front frame section 430 is illustrated that is adapted to provide for a header-based harvesting configuration (e.g., as opposed to the single row harvesting configuration, the multi-row harvesting configuration, and the double row alternating harvesting configuration described above with reference to the embodiments of the front frame sections 130, 230, 330 shown in FIGS. 2-5). As shown, the front frame section 430 extends lengthwise between a front end 434 and a rear interface end 436 and is generally provided with a given front frame arrangement between its front and rear ends 434, 436 for supporting one or more harvesting components of a sugarcane harvester. Similar to the front frame sections 130, 230, 330 described above, the specific frame arrangement of the front frame section 430 may be characterized by various frame features, such as openings, bolt hole patterns, flanges, brackets, and/or the like, adapted or configured to allow various harvesting components of the harvester to be mounted to or otherwise supported by the front frame section 430, such as one or more topper assemblies, crop dividers, knock-down rollers, fin rollers, base cutter assemblies and/or the like. In addition to being configured to support such harvesting components (or as an alternative thereto), the front frame section 430 may be characterized by various frame features that allow for a separate harvesting attachment or header to be coupled to the frame section 430 (e.g., at its front end 434) to allow for added or differing functionality to the associated harvester.

As indicated above, in one embodiment, the front frame section 430 illustrated in FIG. 6 may be adapted to accommodate a separate harvesting attachment or header to provide for a header-based harvesting configuration when installed onto the base frame section 110. Specifically, in one embodiment, the front end 434 of the front frame section 430 may include suitable frame features for coupling a separate header to the frame section 430, thereby allowing the corresponding harvester to be reconfigured to accommodate differing crop types and/or row configurations. For instance, an exemplary header arrangement that allows for a header-based harvesting arrangement is described, for example, in Brazilian Patent App. No. 10/2015/0159226, filed Jun. 30, 2015 and entitled "Header for a Harvesting machine" and its US counterpart (U.S. patent application Ser. No. 15/199,032, filed Jun. 30, 2016) both of which are hereby incorporated by reference herein in their entirety for all purposes. In such an embodiment, the front frame section 430 shown in FIG. 6 may, for example, be configured to support the header disclosed in such reference to provide for a header-based harvesting configuration that can accommodate both crops planted at regular spaced intervals and crops planted without any regularity.

Moreover, as shown in FIG. 6, the rear interface end 436 of the front frame section 430 is configured to be removably coupled to forward end 112 of the base frame section 110. For example, similar to the front frame sections 130, 230, 330 described above with reference to FIGS. 2-5, the front frame section 420 may define an interface portion 432 at its rear interface end 436 that is complementary to or that is otherwise configured to mate with the corresponding forward interface portion 120 defined by the base frame section 110 at its forward end 112. Specifically, as shown in the illustrated embodiment, the interface portion 432 of the front frame section 430 defines an angled profile that is complementary to the angled profile of the forward interface portion 120 defined by the base frame section 110 such that the front frame section 430 can be mounted flush against the base frame section 110. In such an embodiment, the angled profile of the interface portion 432 of the front frame section 430 may be configured the same as the angled profile of the interface portions 132, 232, 332 of the front frame sections 130, 230, 330 shown in FIGS. 2-5 to allow such frame sections 130, 230, 330, 430 be interchangeable relative to the base frame section 110.

Figure 7:
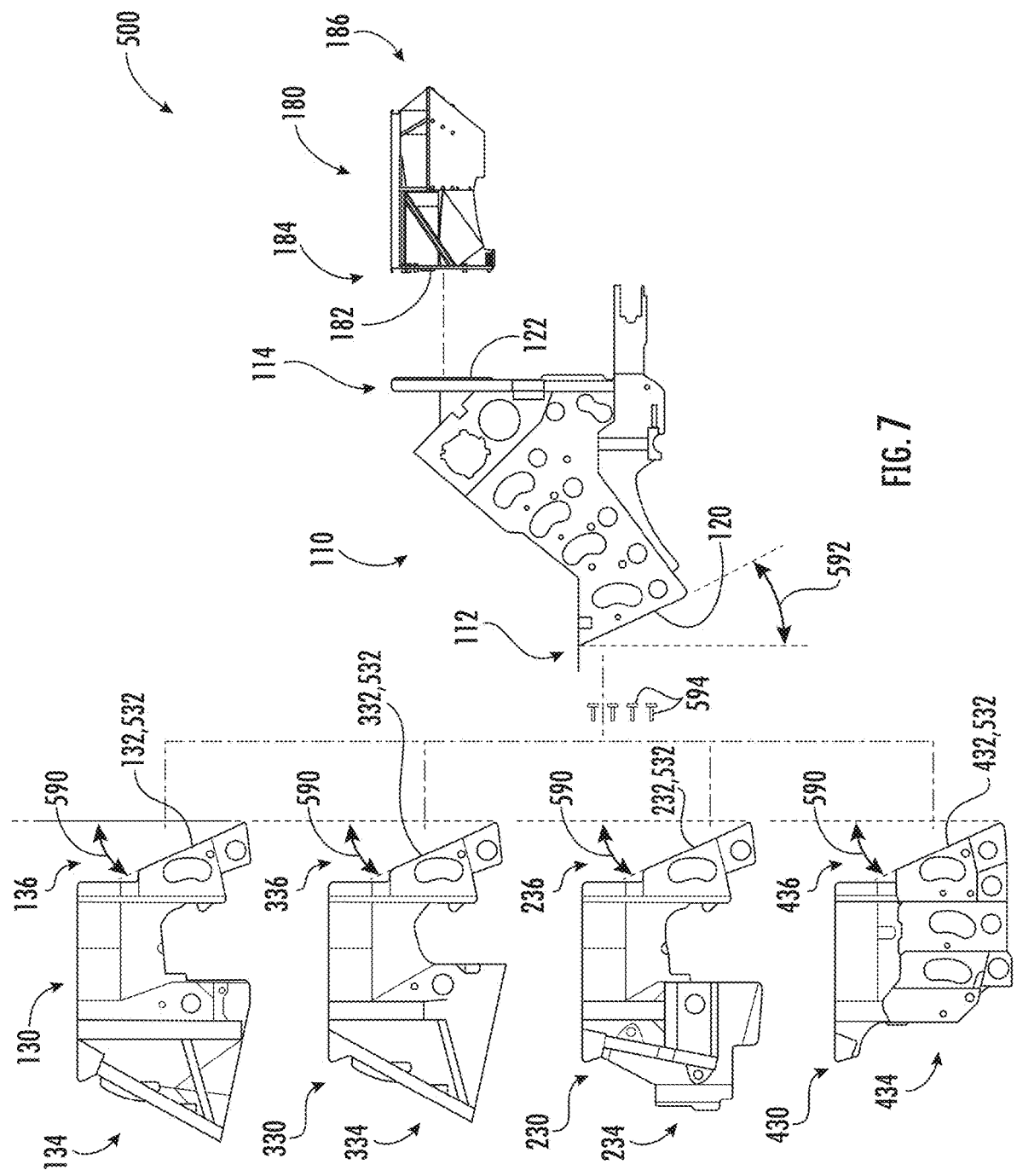
FIG. 7 illustrates an exemplary view of one embodiment of a modular frame system for use with a sugarcane harvester in accordance with aspects of the present subject matter, particularly illustrating the system including a plurality of interchangeable front frame modules, with each front frame module being configured to adapt the associated modular frame assembly to provide a different harvesting configuration.

Referring now to FIG. 7, an exemplary view of one embodiment of a modular frame system 500 for use with an agricultural harvester, such as a sugarcane harvester, is illustrated in accordance with aspects of the present subject matter. As shown, the system 500 includes the base frame section 110 described above with reference to FIGS. 2 and 3, as well as various modular frame sections configured to be removably coupled to the base frame section 110. Specifically, the system 500 may include a plurality of interchangeable front frame modules, such as the various front frame sections 130, 230, 330, 430 described above with reference to FIGS. 2-6, configured to be removably coupled to the forward end 112 of the base frame section 100. In addition, the system 500 may include a rear frame module, such as the rear frame section 180 described above with reference to FIGS. 2 and 3, configured to be removably coupled to the aft end 114 of the base frame section 110.

It should be appreciated that, although only a single rear frame module is shown in FIG. 7 and described herein, the system 500 may, instead, include a plurality of interchangeable rear frame modules configured to be removably coupled to the aft end 114 of the base frame section 110. It should also be appreciated that, although only a single base frame section 110 is shown in FIG. 7 and described herein, the system 500 may, instead, include a plurality of interchangeable base frame sections. For instance, in one embodiment, the base frame section 110 may be configured differently depending on whether the associated harvester 10 includes tires or tracks. In such instance, it may be desirable for the system 500 to include a tire-specific base frame configuration and a track-specific base frame configuration.

As indicated above, the various front frame sections 130, 230, 330, 430 may be configured to be removably coupled to the forward interface portion 120 of the base frame section 110 (e.g., via suitable fasteners 594. In this regard, to allow for interchangeability of the front frame sections 130, 230, 330, 430, the interface portions 132, 232, 332, 432 of such front frame sections 130, 230, 330, 430 may generally correspond to a common interface portion 532 having a common mounting configuration (e.g., a common bolt-hole pattern) and common interface profile between the front frame sections 130, 230, 330, 430 to allow each frame section to be quickly and easily mounted to the base frame section 110. For instance, as shown in FIG. 7, the interface portion 132, 232, 332, 432 of each front frame section 130, 230, 330, 430 may define an angled interface profile that is oriented at an interface angle 590 that is complementary to a corresponding interface angle 592 defined by the forward interface portion 120 of the base frame section 110. As a result, depending on the desired harvesting configuration for the associated harvester, a specific front frame section 130, 230, 330, 430 may be selected for mounting to the base frame section 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A modular frame assembly for a sugarcane harvester, the modular frame assembly comprising:
   a base frame section including a forward end and an aft end, the base frame section defining a forward interface portion at the forward end and an aft interface portion at the aft end, the forward interface portion defining a first interface profile, the base frame section configured to support one or more processing components to facilitate processing of harvested crop materials;
   a front frame section configured to be removably coupled as a module to the forward end of the base frame section, the front frame section including a front end and a rear interface end, the rear interface end of the front frame section defining an interface portion, the interface portion defining a second interface profile complementary to the first interface profile, the interface portion configured to be removably coupled to the forward interface portion of the base frame section, the front frame section being configured to support a plurality of harvesting components to facilitate harvesting of crop materials from a field; and
   a rear frame section configured to be removably coupled to the aft end of the base frame section, the rear frame section including a front interface end and a rear end, the front interface end of the rear frame section defining an interface portion configured to be removably coupled to the aft interface portion of the base frame section, the rear frame section being configured to support one or more extractor components to facilitate separation of debris from harvested crop materials,
   wherein the modular frame assembly is configured such that the harvested crop materials flow through the front frame section to the base frame section and through the base frame section to the rear frame section.

2. The modular frame assembly of claim 1, wherein the first and second interface profiles define complementary angled interface profiles.

3. The modular frame assembly of claim 1, wherein the front frame section has a frame arrangement adapted to provide a harvesting configuration comprising one of a single row harvesting configuration, a multi-row harvesting configuration, a double row alternating harvesting configuration, or a header-based harvesting configuration.

4. The modular frame assembly of claim 1, wherein the plurality of harvesting components comprises at least two of a crop divider, a knock-down roller, a fin roller, or a base cutter assembly.

5. The modular frame assembly of claim 1, wherein the one or more processing components comprise at least one of a feed roller assembly or a chopper assembly.

6. The modular frame assembly of claim 1, wherein the one or more extractor components comprise at least one of an extractor hood or an extractor fan.

7. A modular frame system for a sugarcane harvester, the system comprising:
- a plurality of mechanical fasteners;
- a base frame section including a forward end and an aft end, the base frame section defining a forward interface portion at the forward end, the base frame section configured to support one or more processing components to facilitate processing of harvested crop materials; and
- a plurality of interchangeable front frame sections each configured to be removably coupled as a module to the base frame section, each front frame section of the plurality of interchangeable front frame sections having a unique frame arrangement as compared to the remainder of the plurality of interchangeable front frame sections such that each module is adapted to provide a differing harvesting configuration for the sugarcane harvester when selected for installation on the base frame section, wherein:
each module includes a front end and a rear interface end, the rear interface ends defining a common interface portion configured to be removably coupled to the forward interface portion of the base frame section via the plurality of mechanical fasteners such that the rear interface end of a respective module is fixed relative to the forward end of the base frame section by the plurality of mechanical fasteners.

8. The system of claim 7, wherein:
the forward interface portion of the base frame section defines a first interface profile; and
the common interface portion of each of the plurality of interchangeable front frame sections defines a second interface profile that is complementary to the first interface profile.

9. The system of claim 8, wherein the first and second interface profiles define complementary angled interface profiles.

10. The system of claim 7, wherein the plurality of interchangeable front frame sections include a single row harvesting configuration, a multi-row harvesting configuration, a double row alternating harvesting configuration, and a header-based harvesting configuration.

11. The system of claim 7, wherein each of the plurality of interchangeable front frame sections is configured to support one or more harvesting components to facilitate harvesting of crop materials from a field.

12. The system of claim 11, wherein the one or more harvesting components comprise at least one of a crop divider, a knock-down roller, a fin roller, or a cutter assembly.

13. The system of claim 7, wherein the one or more processing components comprise at least one of a feed roller assembly or a chopper assembly.

14. The system of claim 7, further comprising a rear frame section configured to be removably coupled to the aft end of the base frame section.

15. The system of claim 14, wherein the rear frame section is configured to support one or more extractor components to facilitate separation of debris from harvested crop materials.

16. The system of claim 15, wherein the one or more extractor components comprise at least one of an extractor hood or an extractor fan.

17. The modular frame assembly of claim 1, further comprising a plurality of mechanical fasteners, the interface portion of the rear interface end of the front frame section being configured to be removably coupled to the forward interface portion of the base frame section via the plurality of mechanical fasteners such that the interface portion of the rear interface end is fixed relative to the forward interface portion by the plurality of mechanical fasteners.

* * * * *